United States Patent [19]
Chang

[11] Patent Number: 5,777,443
[45] Date of Patent: Jul. 7, 1998

[54] SEGMENTED DRIVE SYSTEM FOR A BINDING LINE

[75] Inventor: Bobby Chang, Thousand Oaks, Calif.

[73] Assignee: R.R. Donnelley & Sons Company, Chicago, Ill.

[21] Appl. No.: 594,041

[22] Filed: Jan. 30, 1996

[51] Int. Cl.[6] .................................................. H02P 1/54
[52] U.S. Cl. ............................ 318/35; 318/85; 412/16; 412/36; 270/52.17; 270/52.18
[58] Field of Search ..................... 318/34–112; 412/1–43; 270/52.01–52.3

[56] References Cited

U.S. PATENT DOCUMENTS

| | | | |
|---|---|---|---|
| 2,711,897 | 6/1955 | Grunlee | 271/28 |
| 3,317,026 | 5/1967 | Zugel et al. | 198/133 |
| 3,819,173 | 6/1974 | Anderson et al. | 270/54 |
| 3,825,251 | 7/1974 | Beery et al. | 271/258 |
| 4,022,455 | 5/1977 | Newsome et al. | 270/54 |
| 4,050,686 | 9/1977 | McCain et al. | 270/54 |
| 4,384,709 | 5/1983 | McCain et al. | 270/54 |
| 4,802,077 | 1/1989 | Fujii et al. | 363/41 |
| 4,897,587 | 1/1990 | DiGiulio et al. | 318/625 |
| 4,959,600 | 9/1990 | DiGiulio et al. | 318/625 |
| 4,966,352 | 10/1990 | Nuttin | 270/1.1 |
| 5,003,485 | 3/1991 | Francisco | 364/478 |
| 5,011,123 | 4/1991 | Vigano | 270/54 |
| 5,054,984 | 10/1991 | Chan et al. | 412/1 |
| 5,105,363 | 4/1992 | Dragon et al. | 364/469 |
| 5,112,179 | 5/1992 | Chan et al. | 412/1 |
| 5,144,562 | 9/1992 | Stikkelorum et al. | 364/478 |
| 5,287,976 | 2/1994 | Mayer et al. | 209/547 |
| 5,326,087 | 7/1994 | Colson et al. | 270/58 |
| 5,346,196 | 9/1994 | Nussbaum et al. | 270/54 |
| 5,346,437 | 9/1994 | Chang | 474/134 |
| 5,588,224 | 12/1996 | Gianforte et al. | 34/447 |

*Primary Examiner*—David S. Martin
*Attorney, Agent, or Firm*—Marshall, O'Toole, Gerstein, Murray & Borun

[57] ABSTRACT

A drive control system for a binding line having first and second separate binding-line segments, includes a first motor for driving the first binding-line segment, a second motor independent of the first motor for driving the second binding-line segment, and a controller coupled to the first and second motors. The controller is operable in an independent or asynchronous mode for controlling the first and second motors so that the first and second binding-line segments operate independently, and is also operable in a synchronous mode for controlling the first and second motors so that the first and second binding-line segments operate in synchronism with one another.

17 Claims, 11 Drawing Sheets

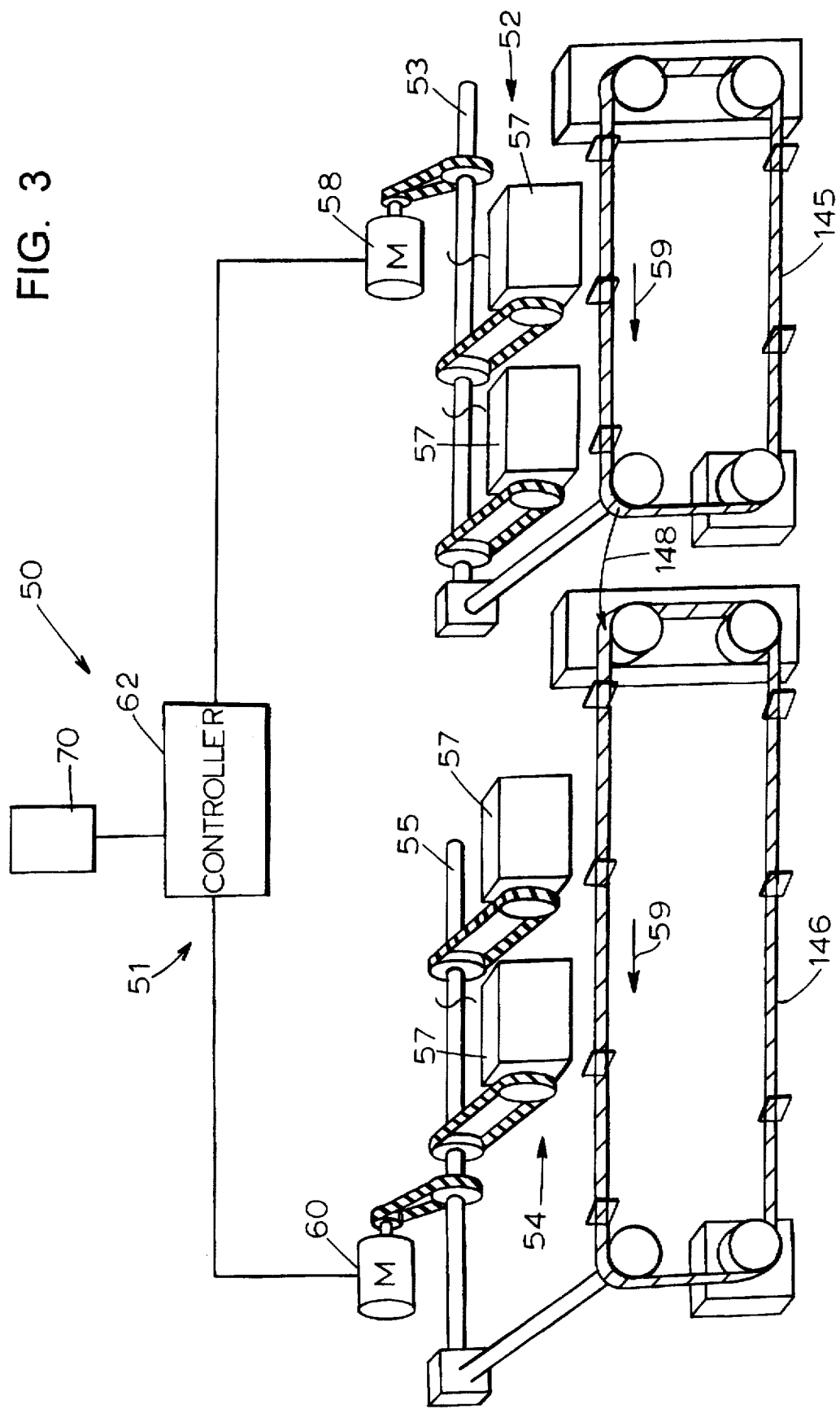

SEGMENTED DRIVE SYSTEM FOR A BINDING LINE

TECHNICAL FIELD

The present invention relates generally to binding lines and, more particularly, to a segmented drive system for driving separate segments of a binding line synchronously and asynchronously.

BACKGROUND ART

A binding line, and particularly a so-called "saddle-stitch" binding line 10 as illustrated in FIG. 1, typically includes a number of binding-line components 12, including, for example, a gatherer, which gathers signatures to be collated into a stack in a particular order, a stitcher, which staples or stitches the stacked signatures together, and a trimmer, which trims the stitched stack of signatures to a predetermined size to produce a finished book. Binding lines typically also include a mail table on which the finished books are addressed, sorted (e.g., by zip code and/or carrier route), and bundled together for shipping. Of course, the binding line 10 can also include additional or alternative components, as desired.

FIG. 2 is a block diagram illustrating a prior-art drive system 14 for the saddle-stitch binding line 10 employing a single drive shaft 16 that mechanically links one or more drivers or motors 18 (only one of which is shown) to all components 12 of the binding line 10 such that motive power produced by the motor 18 is transmitted to all binding-line components 12 via the drive shaft 16. Even though the drive shaft 16 may actually be composite, comprising multiple drive-shaft sections 20, 22, those sections 20, 22 are permanently and mechanically linked, such as by one or more direction-changing gearboxes 24 (and/or by linear ones, not shown), so that all binding-line components 12 nonetheless remain coupled together mechanically by the single composite drive shaft 16 during all phases of operation of the binding line 10. When an operator of the binding line 10 applies "inch" or "run" commands to the motor 18 via a motor controller 26 to cause the prior-art binding line 10 of FIGS. 1 and 2 to operate at a slow speed (i.e., "inching") or at an operating speed (i.e., "running"), all components 12 of the binding line 10 operate synchronously in response to the operator's commands.

This prior-art drive system 14 is therefore disadvantageous for several reasons. First, the mechanical integrity of any binding-line drive system so diminishes as the length of the binding line increases that the accuracy of mechanical movements of binding-line components may be adversely affected. For example, inkjet printers may produce ineligible mailing labels at the mail table as a result of such inaccurate mechanical movements. Consequently, there is a practical, physical limit on the length of a binding line. Further, the substantial length of modern binding lines gives rise to electrical sensing difficulties such that measurement of an angular position of the binding-line drive shaft at one location along the length of the common drive shaft may not reliably represent the angular position at all points along the shaft. This phenomenon can cause some binding-line components to operate out of synchronization with one another.

Another disadvantage of operating all binding-line components from a common drive shaft is that some binding-line components, such as a book trimmer, for example, operate in a pulsating fashion and create periodic vibration which is transmitted to the common drive shaft and propagated along the drive shaft to other binding-line components. Such transmitted vibration can then interfere with the operation of the other binding-line components, which is highly undesirable.

Still another disadvantage is that because binding-line components coupled to a common drive shaft necessarily operate together, a binding-line make-ready or calibration procedure can be performed by only one technician at a time. Specifically, a technician performing a make-ready procedure to prepare a binding line for a particular job cannot inch or run the binding line to calibrate one component of the binding line without interfering with other technicians who might be servicing other components. Consequently, only one component of a prior-art binding line (i.e., a binding line having a single drive shaft) is calibrated or made ready at a time. This necessarily sequential make-ready/calibration procedure results in prolonged down-time for the binding line between jobs, which is costly, inefficient, and undesirable.

To enable binding lines to be made longer, prior-art binding lines comprising multiple binding-line sections have been developed. Each section has its own motor and each motor can have its own controller, or a single controller can be used to control the motors of all sections of the binding line. However, these multi-section binding lines can operate either exclusively synchronously or exclusively asynchronously, but prior-art multi-section binding lines cannot operate synchronously at some times and asynchronously at other times. Consequently, while the division of prior-art binding lines into multiple sections isolates binding-line components from vibrations transmitted from components in other sections, all sections of these multi-section binding lines must nonetheless be shut down together for make-ready if they operate synchronously. If the sections operate asynchronously and independently, they can be made ready in parallel, but significant complexity is introduced in the tracking of books between the various asynchronous segments as discussed fully in Chan, et al. U.S. Pat. No. 5,054,984, assigned to the assignee of the present application.

SUMMARY OF THE INVENTION

According to one aspect of the present invention, a drive controller is provided for a binding line having first and second separate binding-line segments. The drive controller includes first driving means for driving the first binding-line segment, second driving means independent of the first driving means for driving the second binding-line segment, and a controlling means coupled to the first and second driving means. The controlling means is operable in an asynchronous mode for controlling the first and second driving means so that the first and second binding-line segments operate asynchronously, and is further operable in a synchronous mode for controlling the first and second driving means so that the first and second binding-line segments operate in electronic synchronism with one another.

In one embodiment, one of the first and second driving means comprises a motor, and the drive controller includes a digital DC drive coupled to the motor. In that embodiment, the controlling means may include a motion controller, and preferably a programmable motion controller, coupled to the digital DC drive. The controlling means may also include advancing means for advancing the motor relative to the other of the first and second driving means and/or retarding means for retarding the motor relative to the other of the first and second driving means.

According to one feature of the present invention, the controlling means includes mode-indicating means operable at any particular time for indicating the mode of the controlling means at the particular time. The mode-indicating means may include means for providing audibly distinguishable and/or visually distinguishable signals at the first and second binding-line segments corresponding to one or more modes of the controlling means.

According to another feature of the present invention, a mode-selecting means is coupled to the controlling means for selecting one of the synchronous and asynchronous modes for the controlling means. Preferably, the mode-selecting means includes a selector operable between at least a first state wherein the asynchronous mode is selected for the controlling means and a second state wherein the synchronous mode is selected for the controlling means. Also preferably, the synchronous mode of the controlling means comprises an active synchronous mode and an inactive synchronous mode, and the drive controller includes an activator, operable when the selector is in the second state thereof and the controlling means is in the inactive synchronous mode, for placing the controlling means in the active synchronous mode.

In one embodiment, the activator is operable to place the controlling means in the active synchronous mode only when the selector is in the second state thereof. In accordance with another feature of this embodiment, a preventing means is provided for preventing either of the first and second binding-line segments from being turned on when the controlling means is in the inactive synchronous mode. More particularly, the preventing means prevents the first and second binding-line segments from being turned on from a first time when the controlling means is in the inactive synchronous mode until a second time when the controlling means is in the active synchronous mode. In this embodiment, the controlling means may also include mode-indicating means operable at any particular time for indicating the mode of the controlling means at the particular time. Further, once again, the synchronous mode of the controlling means comprises an active synchronous mode and an inactive synchronous mode, and the mode-indicating means indicates when the controlling means is in one of the active synchronous, inactive synchronous, and asynchronous modes. Also, the mode-indicating means may further indicate the occurrence of a transition period extending from a first time when the controlling means is in the inactive synchronous mode until a second time when the controlling means is in the active synchronous mode.

In a specific embodiment of the present invention, a drive control system is provided for a binding line having a stitcher section and a trimmer section. The drive control system includes a first motor coupled to the stitcher section, a first motor drive coupled to the first motor, a second motor independent of the first motor and coupled to the trimmer section, a second motor drive coupled to the second motor, and a motion controller coupled to the first and second motor drives. The motion controller in this embodiment is operable in a first mode wherein the first and second motor drives control the first and second motors, respectively, so that the stitcher and trimmer sections operate independently of one another, and is also operable in a second mode wherein the first and second motor drives control the first and second motors, respectively, so that the stitcher and trimmer sections operate in synchronism with one another.

BRIEF DESCRIPTION OF THE DRAWING

FIG. 3 is a diagrammatic view, similar to FIG. 1, of a binding line having a segmented drive system in accordance with the present invention;

DESCRIPTION OF THE PREFERRED EMBODIMENTS

Figure 1:
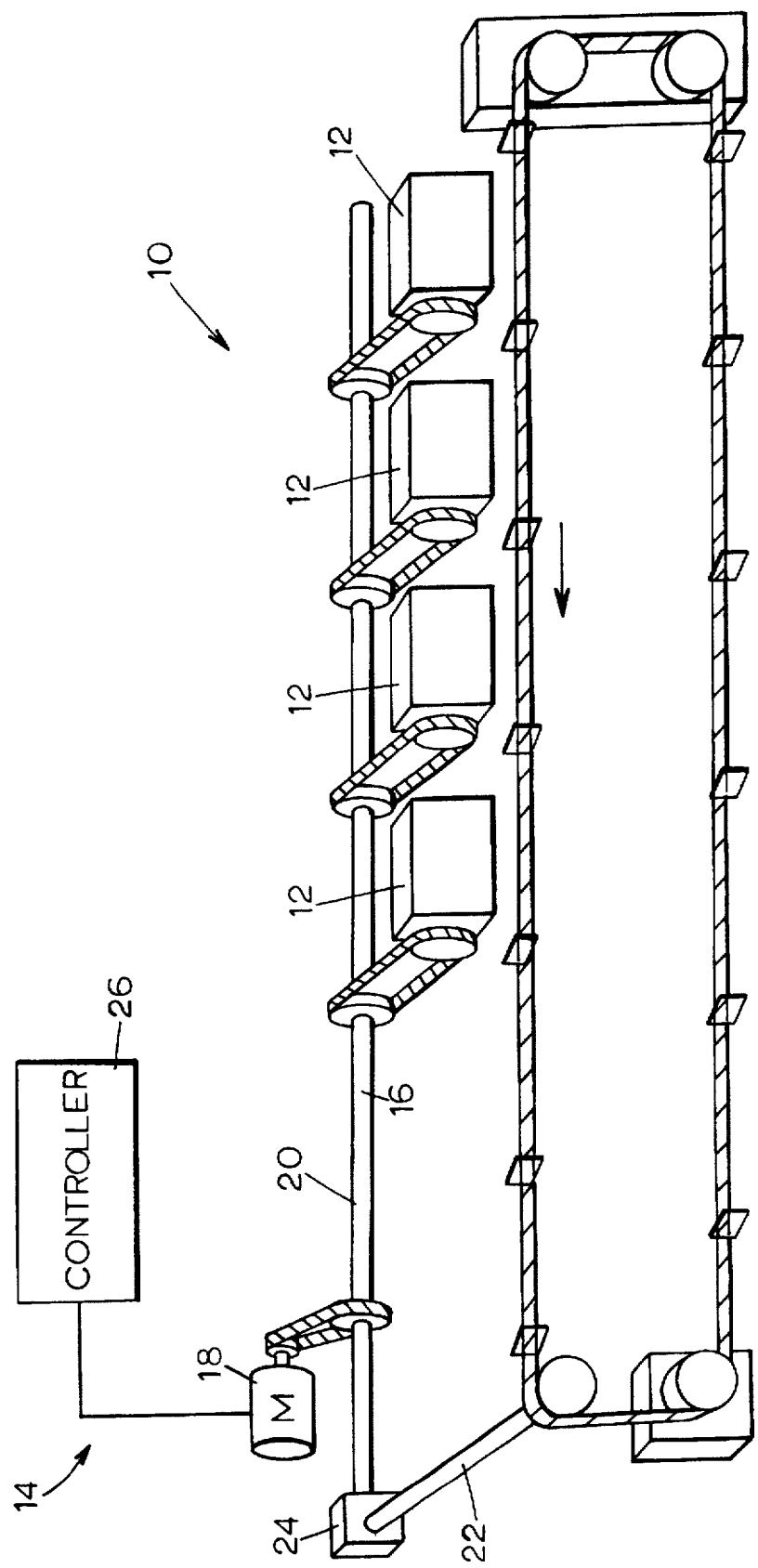
FIG. 1 is a diagrammatic view of a prior-art binding line having a single drive shaft.
Figure 2:
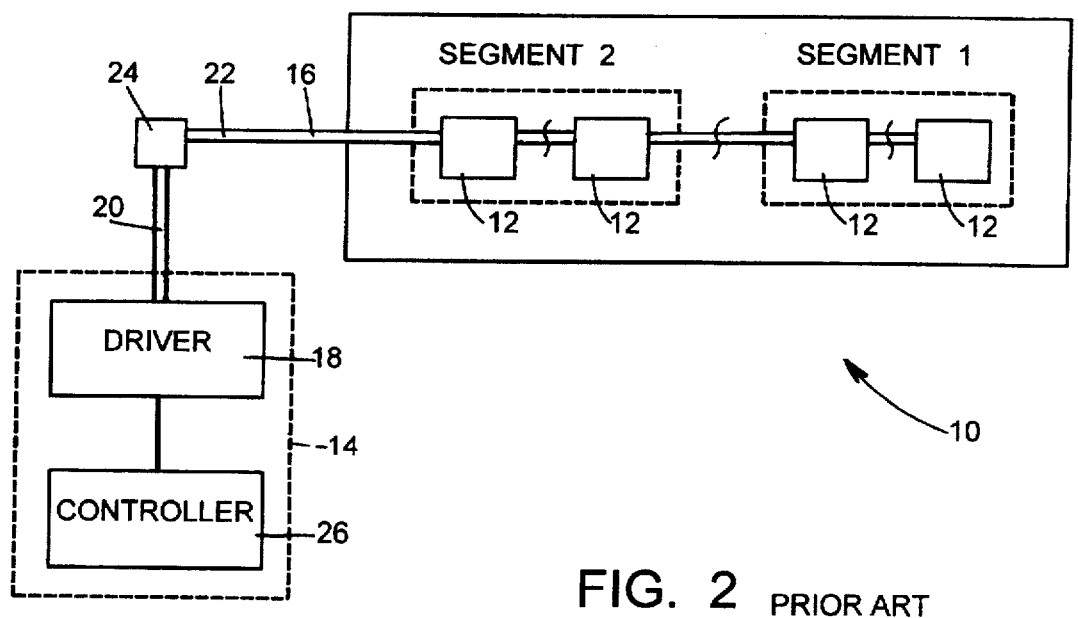
FIG. 2 is a block diagram of a prior-art drive system having a unitary or composite drive shaft as used in the prior-art binding line of FIG. 1.
Figure 4:
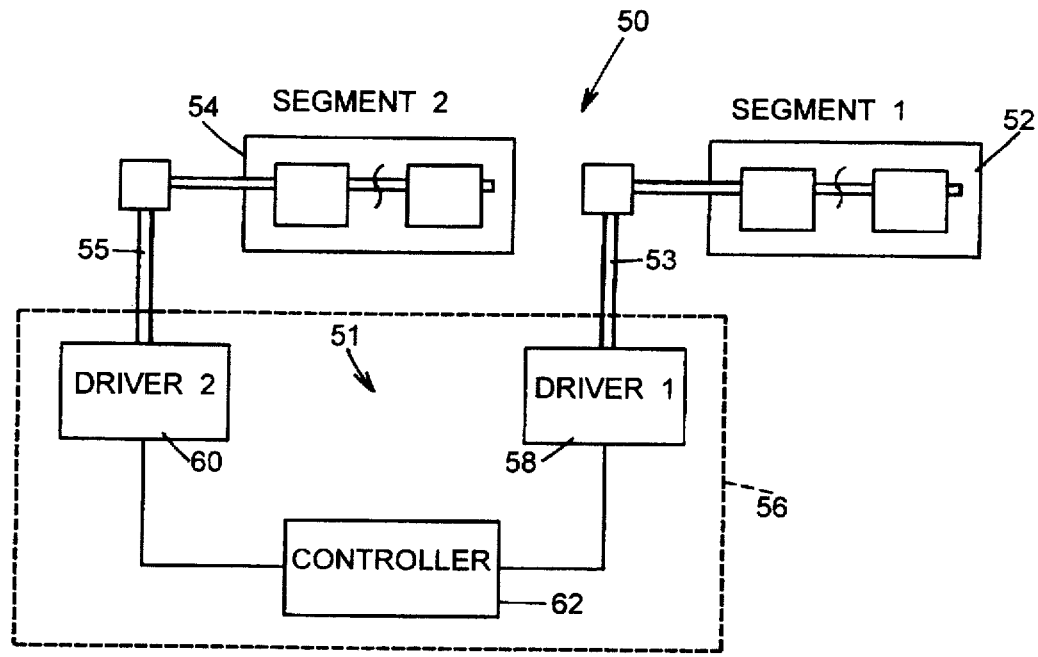
FIG. 4 is a block diagram of a segmented binding-line drive system as used in the binding line of FIG. 3 according to the present invention.

In contrast with the above-described prior-art binding line 10, which, as illustrated in FIGS. 1 and 2, has a unitary or composite drive shaft 16 for operating all binding-line components 12, a binding line 50 having a segmented drive system 51 in accordance with the present invention is shown in FIGS. 3 and 4. The binding line 50 includes first and second separate binding-line segments 52, 54, each having a respective drive shaft 53, 55 coupled to the one or more binding-line components 57 making up that binding-line segment 52, 54, and a drive controller 56. Each independent drive shaft 53 and 55 is a unitary (one-piece) or composite (mechanically linked, multi-piece) shaft similar to the drive shaft 16 of the prior-art binding-line drive system shown in FIG. 1. As indicated by arrows 59, gathered materials travel from right to left (as shown in FIG. 4) along the upper runs of gathering chains 145, 146 (described below) of the binding line segments 52, 54.

The binding line 50 described herein is segmented such that the first binding-line segment 52 (also referred to hereinafter as the "stitcher section") includes the saddle stitcher (not specifically identified in FIGS. 3 or 4) of the binding line 50 as well as all packer boxes (i.e., signature- or card-feeding devices) and any other devices or components 57 upstream of the stitcher in the binding line 50, and such that the second binding-line segment 54 (also referred to hereinafter as the "trimmer section") includes the trimmer, stacker, mail table and/or any other devices or components 57 downstream of the stitcher. Segmenting the drive shaft at this particular location represents a compromise between a central position along the binding line 50, where the attainable time savings from the concurrent make-ready of separate binding-line segments 52, 54 is greatest, and a position immediately adjacent the binding-line mail table, which would isolate the mail table from all vibrations caused by other binding-line components 57. However, it will be readily apparent to those of ordinary skill in the art that, in accordance with the present invention, the binding-line drive shaft may be segmented at any other suitable location along the length of the binding line 50, if desired. Further, as will be explained in more detail hereinafter, the binding line 50 can be segmented, according to the present invention, into any number of segments greater than or equal to two, if desired.

Numerous safety features are incorporated into the segmented drive system of the present invention to reduce the risk that an operator may operate the whole binding line while another operator is working on one of the segments. These safety features will be described herein as applicable.

As illustrated in FIG. 4, the drive controller 56 includes a first driver 58 for driving the first binding-line segment 52 and a second driver 60, which is independent of the first driver 58, for driving the second binding-line segment 54. The drive controller 56 also includes a controlling means 62 coupled to the first and second drivers 58, 60. The controlling means 62 is operable in an asynchronous mode for controlling the first and second drivers 58, 60 so that the first and second binding-line segments 52, 54 operate independently, and is further operable in a synchronous mode for controlling the first and second drivers 58, 60 so that the first and second binding-line segments 52, 54 operate in synchronism with one another.

The first and second binding-line segments 52, 54 of the binding line 50 are mechanically independent of one another in the sense that no mechanical linkage exists between the two segments 52, 54. Instead, an electrical "linkage" can be created between the first and second binding-line segments 52, 54 by the controlling means 62 when operated in the synchronous mode thereof. In order for the controlling means 62 to operate in the asynchronous mode thereof, the electrical linkage between the first and second binding-line segments 52, 54 can be dissolved so that the segments 52, 54 again operate independently of one another and asynchronously. As described above, such hybrid synchronous/asynchronous operation is not available in the prior-art binding line 10 (FIGS. 1 and 2) or in prior-art multiple-section binding lines.

Figure 5:
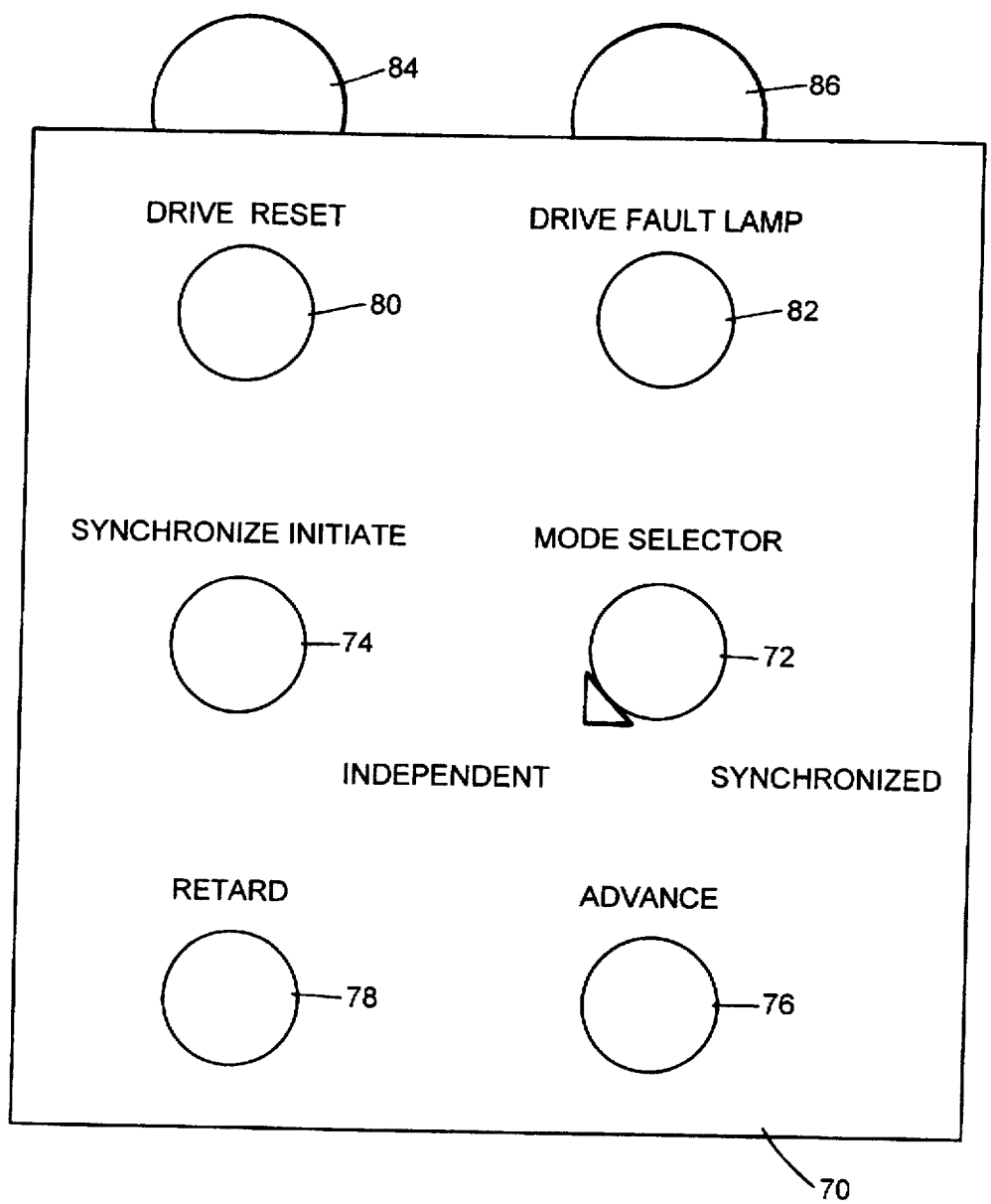
FIG. 5 is an elevational front view of a control panel for operating an embodiment of the binding-line drive system of the present invention.

FIG. 5 illustrates a control panel 70, which provides an interface between an operator of the binding line 50 (FIGS. 3 and 4) and the controlling means 62 of the binding line 50. As shown in FIG. 5, the control panel 70 includes a mode selector switch 72 operable between a first or "independent mode" position and a second or "synchronized mode" position for allowing an operator of the binding line 50 to select between corresponding asynchronous and synchronous modes of operation of the binding line 50 at any particular time. The control panel 70 also includes a "synchronize initiate" button 74, "advance" and "retard" buttons 76, 78, a "drive-reset" button 80, and a "drive-fault" indicator lamp 82. Further, mode status lights 84, 86 are provided for indicating the mode of operation (i.e., independent or synchronized) of the binding line 50 at any particular time. The use of the foregoing controls and indicators 72–86 is described in detail below in connection with FIGS. 6 and 7.

As is known in the art, each binding-line component 57 is provided with "run," "inch," and "stop/start" controls (not shown). Each "run" control is a latched button which remains depressed when pressed by the binding-line operator, until the binding line 50 is stopped either automatically by the controlling means 62 or manually by the binding-line operator using the "stop/start" control of one of the binding-line components 57. Each "inch" control is a momentary-contact button. While it is depressed, it causes one or both binding-line segments 52 and/or 54 to move at a slow, "inch" speed (depending on the mode of the binding line 50 as described below), but such movement ceases as soon as the "inch" button is released. Finally, each "stop/start" control is a button that latches in either of its two positions. When pushed in, it remains depressed; when pulled out, it stays out. The use of each of these controls in the operation of the binding line 50 is explained in detail below.

As is also known in the art, each binding-line segment 52, 54 has one or more lights, called "flicker lights" (not shown), associated therewith. The flicker lights can be on, off, or flashing (i.e., flickering) to provide binding-line status information to the operator of the binding line 50. Audible devices (not shown) are also associated with each binding-line segment 52, 54. In conjunction with the flicker lights, the audible devices serve to warn the operator when the associated segment 52 or 54 of the binding line 50 is inching or running, or when the segment 52, 54 is about to begin such operation. The role of the flicker lights and audible devices is explained in more detail below.

Figure 6:
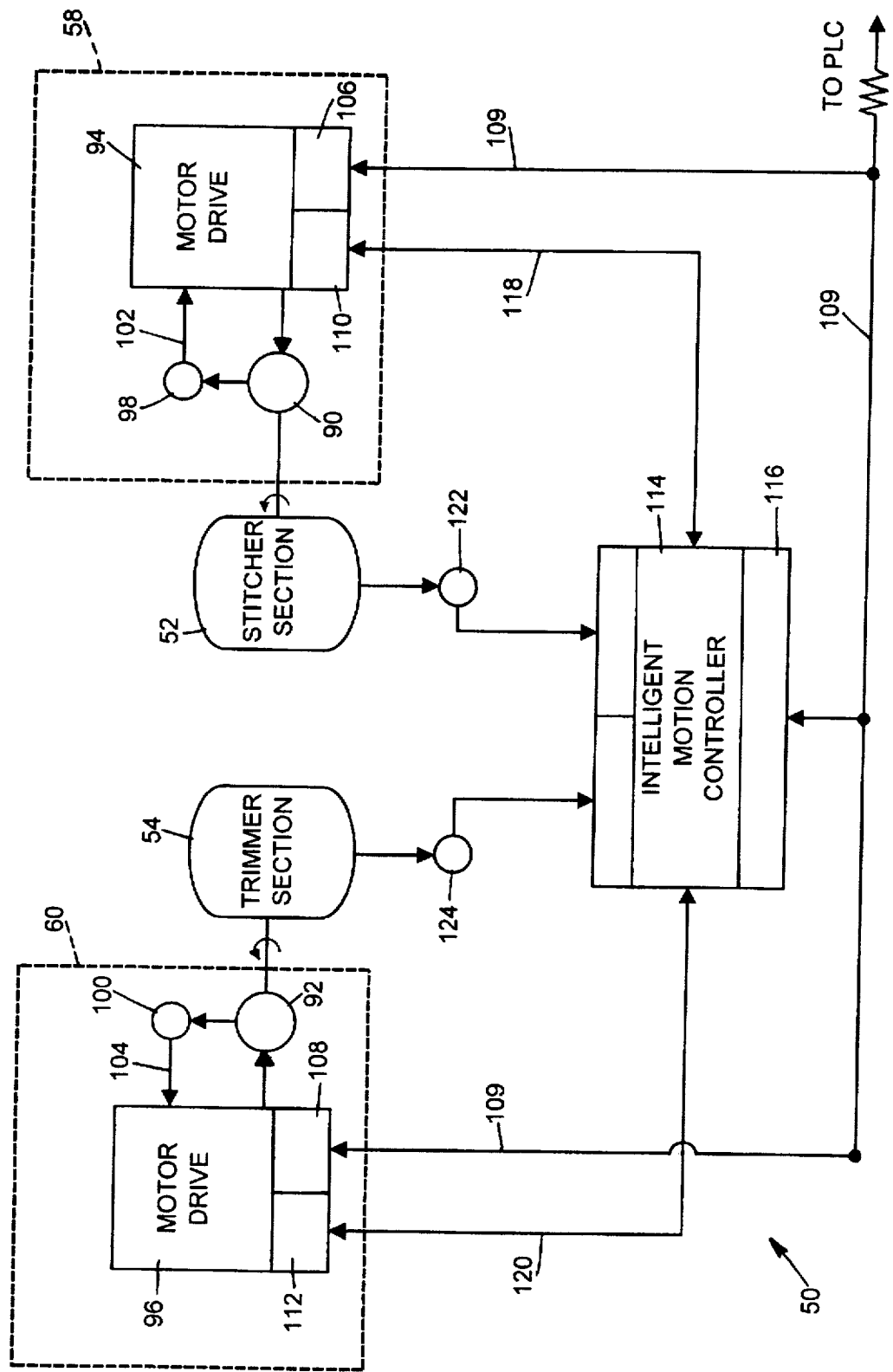
FIG. 6 is a schematic diagram of the segmented drive system of FIG. 3.

FIG. 6 shows the drive controller 56 in additional detail. As shown in FIG. 6, the binding line 50 includes the first binding-line segment 52 and the second binding-line segment 54.

The first driver 58 is coupled to the stitcher section 52 for providing motive power thereto. The second driver 60 independent of the first driver 58 is coupled to the trimmer section 54 for providing motive power thereto.

Each of the first and second drivers 58, 60 includes a respective motor 90, 92, and a respective digital DC motor drive 94, 96 (such as an Allen Bradley Bulletin 1395 Digital DC Drive, for example) which is electrically coupled to each motor 90, 92. Encoders 98, 100 are operatively coupled to the motors 90, 92, respectively, for providing speed signals corresponding to the rotational speeds of the motors 90, 92 to the digital drives 94, 96 via speed signal lines 102, 104, respectively.

Each digital drive 94, 96 includes a node adaptor 106, 108. The node adapters 106, 108 allow bi-directional communication between the digital DC motor drives 94, 96 and a remote I/O bus or communication cable 109 which may connect to a programmable logic controller (not shown) for providing operating instructions to the binding line 50. The node adapters 106, 108 use the remote I/O bus 109 to communicate information concerning fault conditions to a digital fault table which is repeatedly scanned by the programmable logic controller (PLC) to determine when a fault exists within the binding line 50. Because the structure and operation of the PLC forms no part of the present invention, the details of the PLC are omitted herein.

Each digital DC motor drive 94, 96 also includes a discrete adaptor 110, 112 which serves as an input/output (I/O) interface between the respective digital DC motor drive 94, 96 and an intelligent motion controller (IMC) 114, such as an Allen Bradley Model IMC S/212 motion controller, for example. Of course, any other suitable motion controller can be used instead. The motion controller 114 also includes a node adaptor 116 for coupling the motion controller 114 to the remote I/O bus 109. In addition, reference, control, and status information is coupled between the motion controller 114 and the digital DC motor drives 94, 96 via their respective discrete adapters 110, 112, which are connected to the motion controller 114 via multi-conductor cables 118, 120.

A resolver 122 associated with the stitcher section 52 is coupled to the motion controller 114 for providing speed and position information regarding the stitcher section 52 to the motion controller 114. Similarly, a resolver 124 associated with the trimmer section 54 is coupled to the motion controller 114 for providing speed and position information regarding the trimmer section 54 to the motion controller 114.

Power supplies for the various elements of the binding line 50 are not shown in FIGS. 3 and 4, because it will be readily apparent to those skilled in the art that any suitable power supply may be used.

Each digital drive 94, 96 delivers speed and position commands to a respective motor 90, 92 according to instructions that the digital drive 94, 96 receives from the intelligent motion controller 114 and also based on motor speed signals provided to the digital drives 94, 96 by the respective encoders 98, 100. The instructions from the motion controller 114 are based, in turn, on motor speed and position feedback signals provided to the motion controller 114 by the respective resolvers 122, 124.

Figure 7:
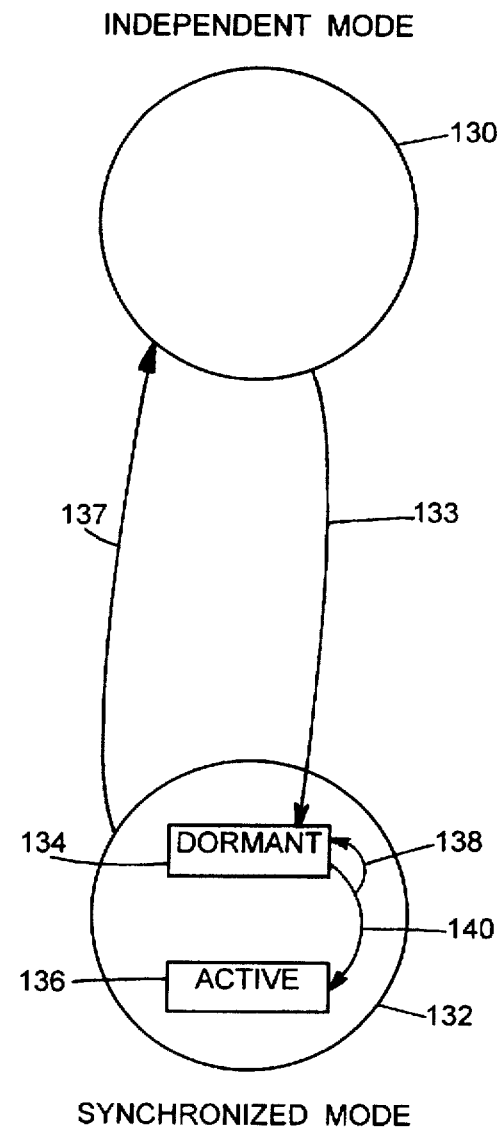
FIG. 7 is a state diagram illustrating the functional operation of the binding-line drive system of the present invention.

FIG. 7 is a state diagram generally illustrating the independent and synchronized operating modes of the binding line 50 of FIG. 6 (as well as various transition paths between those modes).

The motion controller 114 of the binding line 50 is operable in a first or "independent" mode 130 and a second or "synchronized" mode 132. When the controller 114 operates in the independent mode 130, the stitcher and trimmer sections 52, 54 can be operated independently of one another and asynchronously by one or more operators of the binding line 50. In contrast, when the controller 114 operates in the synchronized mode 132, the stitcher and trimmer sections 52, 54 of the binding line 50 operate together and in synchronism with one another. When the operator issues a "run" command to a binding line 50 operating in the synchronized mode 132, the various sections 52, 54 of the binding line 50 simultaneously begin to run, and they remain "position-locked" with one another and run at equal speeds until the binding line 50 stops or until the mode selector switch 72 is moved to the "independent mode" position thereof.

When operating in the synchronized mode 132, the binding line 50 can operate at either of two speeds. First, the binding line 50 can be "inched" or operated at the minimum speed of the binding line. Second, the binding line 50 can be "run" or operated at the normal operating speed thereof. Similarly, when the binding line 50 operates in the independent mode 130, each binding-line segment 52, 54 can be inched, run, or stopped independently of the other segment 54 or 52.

The actual independent-mode minimum speed or "independent inch speed" for the binding-line segment 52 can be the same as, or different than, the independent inch speed for the binding-line segment 54, and the independent inch speed of either segment 52 or 54 can, but need not, be equal to the synchronized inch speed of the binding line 50 when operated in the synchronized mode 132 thereof. Also, the run speed of the entire, synchronized binding line 50 operating in the synchronized mode 132 can be the same as, or different than, either of the separate, "independent" run speeds at which binding-line segments 52, 54 run when operated while the binding line 50 is in the independent mode 130.

The numerical values of the synchronized inch speed of the binding line 50 in the synchronized mode 132 and the independent inch speeds of the binding-line segments 52, 54 in the independent mode 130 can be adjusted by the binding-line operator by setting corresponding inch-speed parameters in the intelligent motion controller 114 in a conventional fashion. When the binding line 50 operates in the independent mode 130, the independent run speeds of the stitcher and trimmer sections 52, 54 are separately controlled by independent speed references, which may be separately adjusted by the binding-line operator also in a conventional fashion using respective separate potentiometers (not shown), one of which is associated with each section 52, 54.

The operation of the binding line 50 in the independent and synchronized modes 130, 132 thereof, as well as in transitions from each mode to the other, is now explained in detail with reference to the state diagram of FIG. 7.

The mode of operation of the binding line 50 at any particular time is determined by the setting of the mode selector switch 72 (FIG. 5) at that time. When the mode selector switch 72 is in the "independent mode" position, the binding line 50 is in the independent mode 130. In that mode, each binding-line segment 52 or 54 is controlled by its own run, inch, and stop/start controls (not shown) and is unaffected by the run, inch, and stop/start controls of the other binding-line segment 54 or 52. When the mode selector switch 72 is moved to the "synchronized mode" position, the binding line 50 is placed in the synchronized mode 132 (as indicated by the arrow 133 in FIG. 7), but synchronization of the independent binding-line segments 52, 54 does not occur automatically. Instead, the binding line 50 enters the synchronized mode 132 in a dormant state (represented by a block 134 in FIG. 7).

When the binding line 50 is in the dormant state 134, all inch and run controls of the binding line 50 are disabled so that the binding line 50 will not respond to inch or run commands from the binding-line operator. When the binding line 50 is in this dormant state 134, the binding-line operator can either: (1) initiate synchronization of the binding line 50 by pressing and holding the synchronize initiate button 74 to bring the binding line 50 into an active state of the synchronized mode 134 (represented by a block 136 in FIG. 7), or (2) return the binding line 50 to the independent mode 130 by simply moving the mode selector switch 72 (FIG. 5) back to the "independent mode" position. As indicated by the arrow 137 in FIG. 7, moving the mode selector switch 72 to the "independent mode" position will immediately return the binding line 50 to the independent mode 130, not only from the dormant state 134, but also from the active state 136 of the synchronized mode 132.

For operator safety, if the mode selector switch 72 is moved from the "synchronized mode" position to the "independent mode" position (or vice-versa) while either binding-line segment 52 or 54 is running (or inching), all components 12 of the binding line 50 stop automatically.

When the binding line 50 is in the dormant state 134 of the synchronized mode 132, an operator can initiate synchronization, as noted above, by pressing and holding the synchronize initiate button 74 (FIG. 5) until synchronization is complete. If the synchronize initiate button 74 is released before the binding line 50 reaches the active state 136 of the synchronized mode 132, the binding line 50 returns to the dormant state 134 (illustrated by the arrow 138 in FIG. 7) rather than completing the transition (illustrated by the arrow 140 in FIG. 7) to the synchronized mode 132. Also, this synchronization cannot be commenced unless the binding line 50 is "enabled" such that no fault condition exists and all stop/start controls of the binding line 50 are in the "start" position (i.e., pulled out). If any stop/start control is in the "stop" position, or if any fault condition is present, pressing the synchronize initiate button 74 will have no effect.

When the synchronize initiate button 74 is depressed, the intelligent motion controller 114 examines the angular positions of the motors 90, 92 of the stitcher and trimmer sections 58, 60, respectively, by reading the resolvers 122, 124. If the angular positions of the motors 90, 92 differ, the motion controller 114 commands the motor drive 96 of the trimmer section motor 92 to advance the motor 92 until the angular positions of the motors 90 and 92 are separated by no more than a predetermined maximum angular offset (which may have a zero or non-zero value). Once this "synchronization" is complete, the binding line 50 will remain in a so-called "position locked" (i.e., synchronized) condition, wherein each motor 90 and 92 will remain position locked in the same angular position as the other. The binding line 50 will then have moved to the active state 136 of the synchronized mode 132 (illustrated by the arrow 140 in FIG. 7) and will once again respond to inch and run commands from the binding-line operator. When the binding line 50 is in this active state 136, both motors 90 and 92 can be run at the synchronized run speed for the binding line 50 (which, in one embodiment, is equal to the independent run speed of the stitcher section 52), or can be inched at the synchronized inch speed for the binding line 50.

When the binding line 50 is in the independent mode 130, the "independent mode" indicator light 84 (FIG. 5) is on and the "synchronized mode" indicator light 86 (FIG. 5) is off. When the binding line 50 is in the dormant state 134 of the synchronized mode 132, both indicator lights 84 and 86 remain off. When the binding line 50 is in the active state 136 of the synchronized mode 132, the light 86 is on, and the light 84 is off. During the transition 140 from dormant state 134 of the synchronized mode 132 to the active state 136, both indicator lights 84 and 86 flash on and off.

The advance and retard buttons 76, 78 (FIG. 5) are used to change the predetermined angular offset which separates the angular positions of the two motors 90, 92 when the binding line 50 is synchronized. The advance button 76 advances the angular position of the motor 92 of the trimmer section 54 relative to the angular position of the motor 90 of the stitcher section 52 in order to increase the angular offset between the binding-line segments 52, 54. Likewise, the retard button 78 retards the trimmer section motor 92 relative to the stitcher section motor 90 to decrease the angular offset. These two controls 76, 78 are operable only during inch or run operations of the binding line 50 operating in the synchronized mode 132.

Typically, an operator would need to change the angular offset between the binding-line segments only to compensate for certain mechanical conditions including inordinate stretch of either of the gathering chains (145 and 146 in FIG. 3) or feeding of signatures of an unusually large or small size. Because the binding-line segments 52, 54 have separate gathering chains 145, 146, respectively, it will be readily apparent to those of ordinary skill in the art that conventional means (indicated by an arrow 148 in FIGS. 3 and 4) should be employed between the binding-line segments 52, 54 for transferring signatures placed on the gathering chain 145 by the binding-line segment 52 to the gathering chain 146 for further processing by the binding-line segment 54. This transferring apparatus should be coupled to the drive shaft 53 or 55 of an arbitrarily chosen one of the binding-line segments 52, 54 (e.g., the drive shaft 55 of the trimmer section 54). Of course, the transferring apparatus alternatively could have an independent drive shaft and motive power source, if desired, and similar safety features, controls, and warnings may be provided in connection therewith.

The drive-reset button 80 (FIG. 5) is used to reset the intelligent motion controller 114 when a fault is detected by the PLC of the binding line 50. When a fault exists, the drive fault lamp 82 illuminates to notify the binding-line operator. An optional indicator (not shown) may also be provided to inform the operator of the cause of the fault, if desired.

Numerous conditions can give rise to a fault which would stop the binding line. First, a fault results when a jam occurs in any component of the binding line 50. Second, the motion controller 114 can generate a fault if it detects, during synchronization, that either the angular offset or the speed offset between the motors 90, 92 of the binding-line segments 52, 54 exceeds a predetermined maximum allowable error after a predetermined maximum allowable time within which the controller should be able to synchronize the motors 90, 92. Third, if the motion controller 114 fails to receive position feedback from either resolver 122, 124, indicating an electrical problem (e.g., a broken connection or faulty wiring, etc.). Fourth, an electrical overload (current or voltage) will trigger a fault and shut down the binding line 50. Of course, other or different conditions can give rise to faults that will cause the binding line 50 to stop. After any fault conditions are eliminated, operations of the binding line 50 may be resumed only by pressing the drive-reset button 80.

By design, several additional safety features are incorporated in the operation of the binding line 50 in the independent and synchronized modes 130, 132 thereof. When power is provided to the binding line 50, if (1) the mode selector switch 72 is in the "independent mode" position, (2) no inch or run control is being depressed, and (3) all stop/start controls are in the "start" position, the binding line 50 enters a two-minute permissive period, during which the flicker lights flash, visually warning the binding-line operator that independent running (or inching) of either segment 52, 54 is permissible. During the permissive period, if an inch control of one of the binding-line segments 52 or 54 is pressed, an audible warning alarm will sound for two seconds, and that segment will then run until the inch control is released.

For ease of operator recognition of the audible warning, the audible devices of the binding-line segment 52 produce an "independent alert" sound that is audibly distinguishable from the "independent alert" sound produced by the audible devices of the binding-line segment 54 when the binding line 50 is in the independent mode 130. When the binding line 50 is in the synchronized mode 132, the audible devices of both binding-line segments 52, 54 produce a "synchronized alert" sound that is audibly distinguishable from either of the "independent alert" sounds.

For example, the audible alert for the first binding-line segment 52 can be a buzzer which sounds only in the vicinity of the first binding-line segment 52, and the audible alert for the binding-line segment 54 can be a bell which rings only in the vicinity of the second binding-line segment 54. In the synchronized mode 132 (FIG. 7), the audible alert in each segment 52, 54 can be a combination of the buzzer and the bell which sounds in the vicinity of both segments 52, 54 and which is audibly distinguishable from the independent-mode audible alert of either segment 52, 54 operating in the independent mode 130. The distinguishability of the audible alerts ensures that binding-line operators and technicians can determine the mode of the binding line 50 before any synchronized- or independent-mode INCH or RUN operation. In addition to, or instead of, these audible alerts, visually distinguishable alert signals may be provided for the same purposes.

If the inch control is pressed again within eight seconds of the inch control having been previously pressed within the permissive period, the segment will once again run, with no audible warning, until the inch control is once again released. Each segment 52, 54 has a separate eight-second timer for this purpose. Similarly, if a run control of either binding-line segment 52 or 54 is pressed during the permissive period, that segment 52, 54 will run, following a corresponding audible and/or visual warning, until the run control is released.

If no inch or run control is pressed during the two-minute permissive period, then the binding line 50 will be forced into a safety fault state wherein the inch and run controls are disabled. In order to restore operation of these controls and initiate a new two-minute permissive period, any one of the stop/start controls must be pushed in and then pulled back out. This requirement merely ensures that an operator must be aware of the state of the binding line 50 before initiating any inch or run operation.

In a similar manner, a two-minute permissive period exists for the synchronized mode 132 (FIG. 7) of the binding line 50, during which inch and run commands can be given to operate both segments 52, 54 of the binding line 50 in the synchronized mode 132.

While the foregoing description relates to a binding line 50 having two segments 52 and 54 (stitcher and trimmer sections), it will be readily apparent to those of ordinary skill in the art that, in accordance with the principles of the present invention, a binding line may be further segmented into three or more segments. In such an embodiment, independent and active synchronized operation would be substantially the same as in the case of the two-segment binding line 50 described herein. The synchronization of a binding line having more than two segments, however, entails first synchronizing the second segment to the first, then synchronizing the third segment to the second, and so on, until the final binding-line segment is synchronized with the penultimate one. Of course, the cost, complexity, and safety concerns will increase with the additional segmentation, but, in return, even greater savings in binding-line make-ready time and enhanced isolation of vibration are possible. Moreover, the introduction of segmentation and hybrid synchronous/asynchronous operation into the binding line 50, in accordance with the present invention, substantially eliminates the mechanical constraints which restricted the length of the prior-art binding line 10 (FIGS. 1 and 2). The safety features in a multiple-segment synchronous/asynchronous binding line are simply natural extensions of those employed in the two-segment binding line described herein.

The programming executed by the controlling means 62 (FIGS. 3 and 4) to operate the segmented drive system 51 of the present invention is now described in detail with reference to the flowcharts of FIGS. 8–11.

Figure 8:
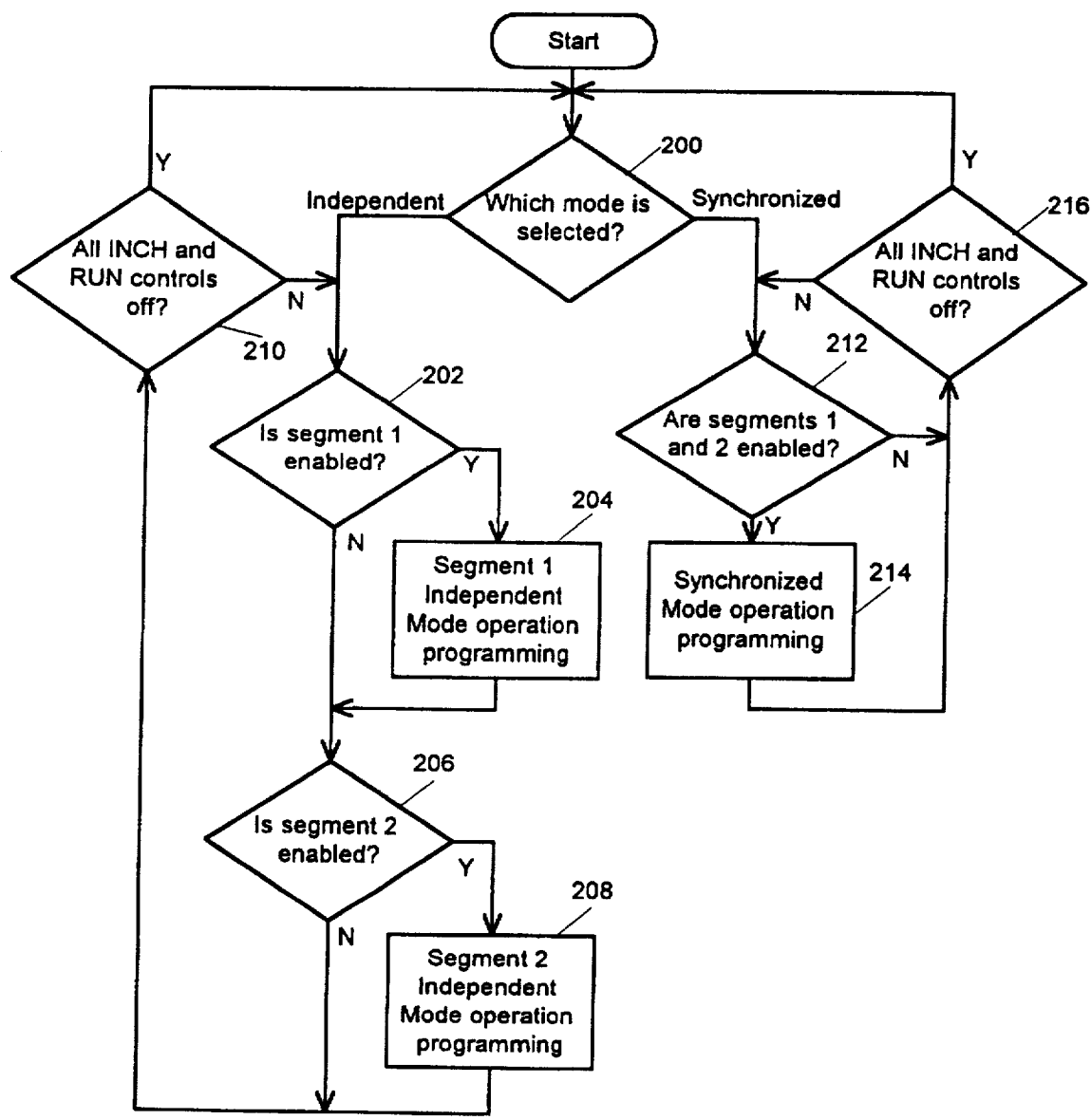
FIG. 8 is a high-level flowchart illustrating programming used to implement the present invention.

FIG. 8 comprises a high-level flowchart which essentially illustrates the main program run by the controlling means 62. When power is applied to the controlling means 62 (FIG. 5), execution of the program begins at a block 200 which determines what mode is selected by the mode selector switch 72 (FIG. 5). If the mode selector switch 72 is set to the "independent mode" position, then a block 202 determines whether the binding line 50 is enabled (i.e., whether no fault conditions are detected in the first binding line segment 52 ("segment 1") and all STOP/START controls in segment 1 are in the START position). If so, control passes to a block 204 which executes independent-mode operation programming for segment 1. This independent-mode operation programming is described in detail below in connection with FIG. 9. When execution of the programming of block 204 is complete, control passes to a block 206. If the block 202 determines that segment 1 is not enabled (i.e., that any STOP/START control in the first binding-line segment 52 is in the STOP position or that any fault condition is detected in segment 1), the block 204 (i.e., the programming of FIG. 9) is bypassed and control passes directly to the block 206.

In the same fashion, the block 206 determines whether the second binding-line segment 54 ("segment 2") is enabled (i.e., whether no fault conditions are detected in segment 2 and all STOP/START controls in segment 2 are in the START position). If so, a block 208 executes the independent-mode operation programming of FIG. 9. It should be noted that the independent-mode operation programming of the block 208 (for segment 2) is identical to the programming of the block 204 (for segment 1), except that references to segment 1 or the first binding-line segment 52 in FIG. 9 and the accompanying description are replaced with corresponding references to segment 2 or the second binding-line segment 54. When execution of the independent-mode operation programming for segment 2 is complete, control passes to a block 210. If the block 206 determines that segment 2 is not enabled (i.e., that any STOP/START control in segment 2 is set to the STOP position or that any fault condition is detected in segment 2), the block 208 (i.e., the programming of FIG. 4) is bypassed, and control passes directly to the block 210.

The block 210 examines the INCH and RUN controls of both binding-line segments 52 and 54. If any INCH or RUN control is pressed, control passes back to the block 202, and if no INCH or RUN control is pressed then control passes back to the block 200 to re-test the mode selector switch 72 (FIG. 5).

If the block 200 determines that the mode selector switch 72 is set to the "synchronized mode" position, rather than the "independent mode" position, then a block 212 examines the STOP/START controls and checks for fault conditions of both binding-line segments 52 and 54. If all STOP/START controls are in the START position and no fault condition is detected in either segment 52 or 54, then a block 214 executes synchronized-mode operation programming described in detail below in connection with FIGS. 10A–10B and FIG. 11. When execution of that programming is complete, control passes to a block 216 which, like the block 210, examines the INCH and RUN controls of both binding-line segments 52 and 54. If the block 212 determines that either segment is not enabled (i.e., that any STOP/START control is in the STOP position or that any fault condition in either segment is detected), the block 214 (i.e., the programming of FIGS. 10A–10B and FIG. 11) is bypassed, and control passes directly to the block 216.

If the block 216 determines that no INCH and RUN control is pressed, then control returns to the block 200, and if the block 216 determines that any INCH or RUN control is pressed, then control returns to the block 212.

Figure 9:
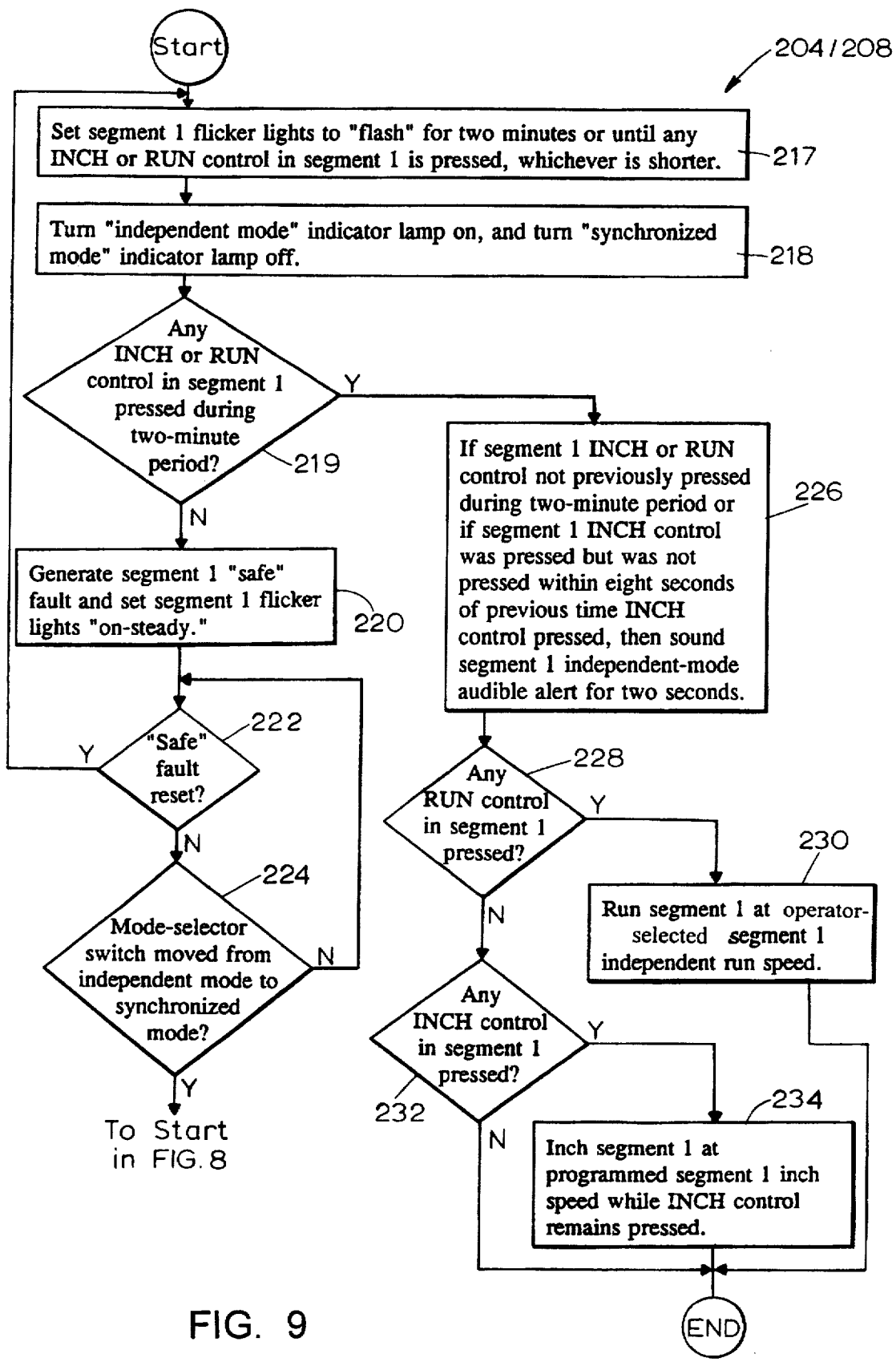
FIG. 9 is a flowchart illustrating programming associated with operation of a binding line in the independent mode of FIG. 7.

The independent-mode operation programming of either binding-line segment 52 or 54 (i.e., the programming of the blocks 204 and 208 (FIG. 8)) is now described in detail with reference to FIG. 9. For simplicity, this description refers only to the segment 1 independent-mode operation programming of the block 204 (FIG. 8) but, as noted above, the independent-mode operation programming for segment 2 functions in exactly the same way.

Initially, a block 217 (FIG. 9) sets the flicker lights in segment 1 to flash (i.e., to blink on and off repeatedly) for a two-minute period or until any INCH or RUN control in segment 1 is pressed, whichever is shorter. A block 218 then turns on the "independent mode" indicator lamp 84 and turns off the "synchronized mode" indicator lamp 86 (FIG. 5). At this point, the binding line 50 is in the independent mode 130 (FIG. 7). A block 219 then determines whether an INCH or RUN control in segment 1 was pressed during the two-minute period. If no INCH or RUN control in segment 1 was pressed during the two-minute period, then a block 220 generates a segment 1 "safe" fault and sets the segment 1 flicker lights to stay on continuously. The "safe" fault in segment 1 disables any INCH or RUN operation of segment 1 until the fault is reset. To reset the "safe" fault, the binding-line operator must push a STOP/START control in segment 1 to the STOP position and then pull it back out to the START position. A block 222 determines whether an operator has reset the "safe" fault. If so, control returns to the block 217, and if not, then a block 224 checks the position of the mode selector switch 72 (FIG. 5) to determine whether it has been moved from the "independent mode" position to the "synchronized mode" position thereof. If the mode selector switch 72 (FIG. 5) has been moved to the "synchronized mode" position, then the independent-mode operation programming ends, and control returns to the block 200 of FIG. 8. If the mode selector switch 72 (FIG. 5) is still in the "independent mode" position, control returns to the block 222, and the "safe" fault condition of segment 1 continues.

If the block 219 determines that an INCH or RUN control in segment 1 was pressed during the two-minute period of the block 218, then a block 226 sounds the segment 1 independent-mode audible alert for two seconds if either of two conditions is satisfied. First, the segment 1 independent mode audible alert is sounded by the block 226 if a segment 1 INCH or RUN control was pressed but none was previously pressed during the two-minute period of the block 219. This alert condition warns operators and technicians the first time an INCH or RUN operation is about to begin. Second, the alert is also sounded if an INCH control in segment 1 was pressed but was not pressed within eight seconds of the previous time when an INCH control in segment 1 was pressed. This alert condition allows an operator to perform successive INCH operations (no more than eight seconds apart) without repeatedly hearing the audible warning, but the audible warning is reinstated if the operator waits more than eight seconds between successive INCH operations.

After the two-second audible alert generated by the block 226, if any, control passes to a block 228 which determines whether a RUN control in segment 1 was pressed during the two-minute period of the block 218. If so, a block 230 runs the first binding-line segment 52 at its operator-selected independent RUN speed, and control then returns to the block 206 (FIG. 8). Of course, if the independent-mode operation programming of FIG. 9 was executed by the block 208 rather than by the block 204, then control returns not to the block 206 but rather to the block 210 of FIG. 8.

If the block 228 determines that no segment 1 RUN control was pressed during the two-minute period of the block 218, then a block 232 determines whether any INCH control in segment 1 was pressed. If an INCH control in segment 1 was pressed, then a block 234 inches segment 1 at its programmed independent INCH speed for as long as an INCH control in segment 1 remains depressed. If the block 232 determines that no INCH control in segment 1 was pressed, then execution of the independent-mode operation programming (FIG. 9) ends and control returns to one of the blocks 206 or 210 of FIG. 8.

Figure 10A:
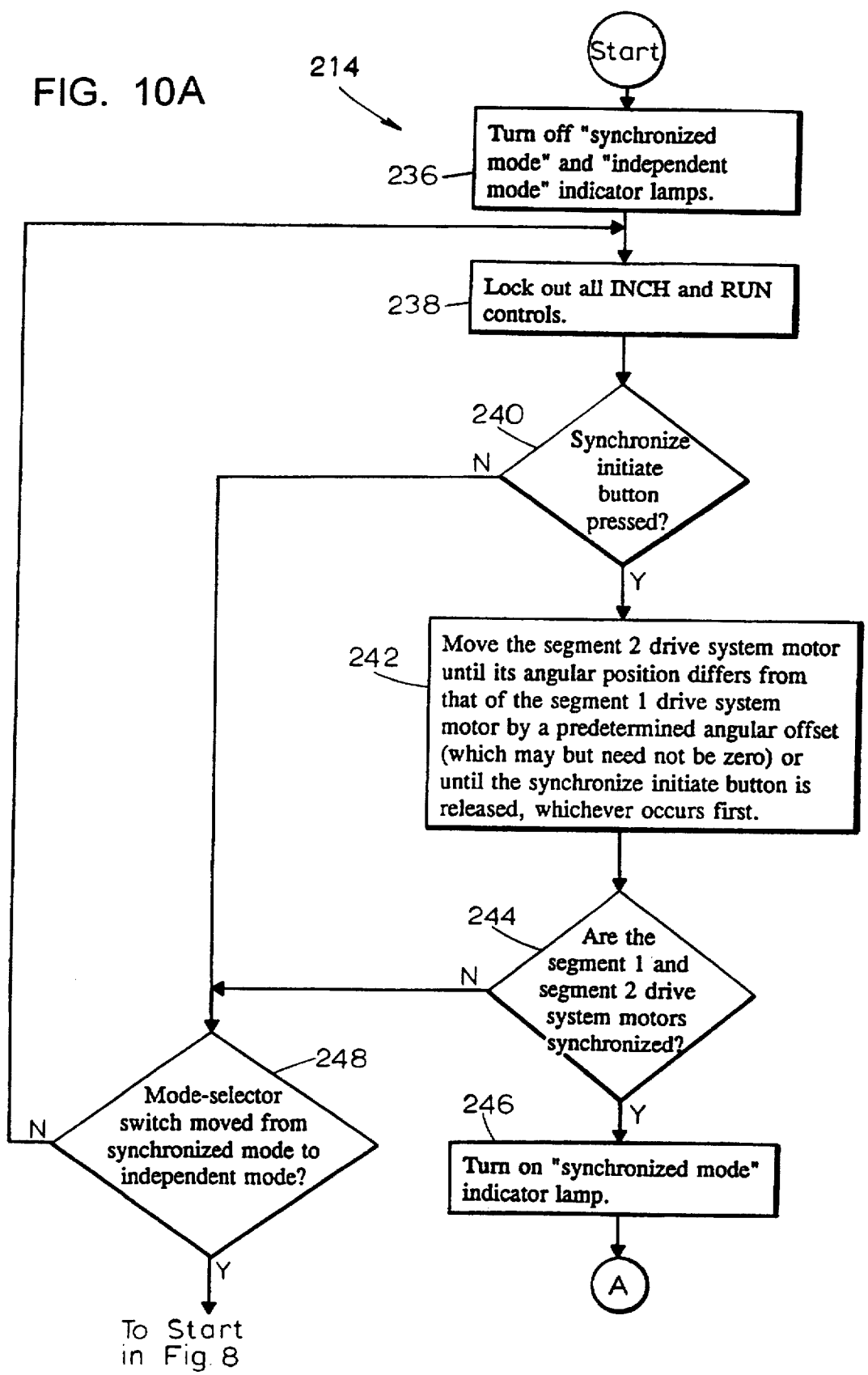
FIGS. 10A–10B, when joined along the similarly lettered lines, together comprise a flowchart illustrating programming associated with operation of a binding line in the synchronized mode of FIG. 7.
Figure 10B:
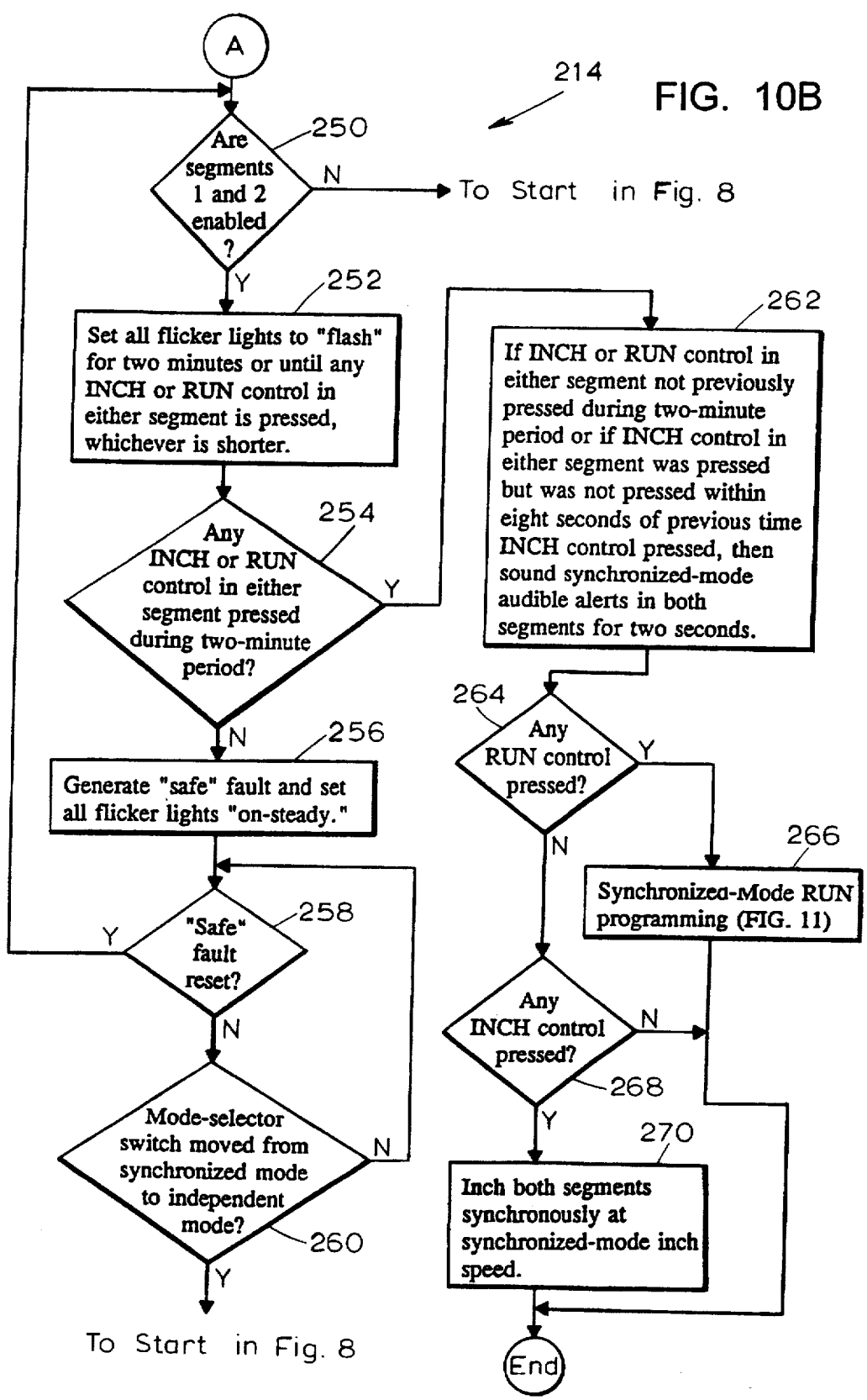
Figure 11:
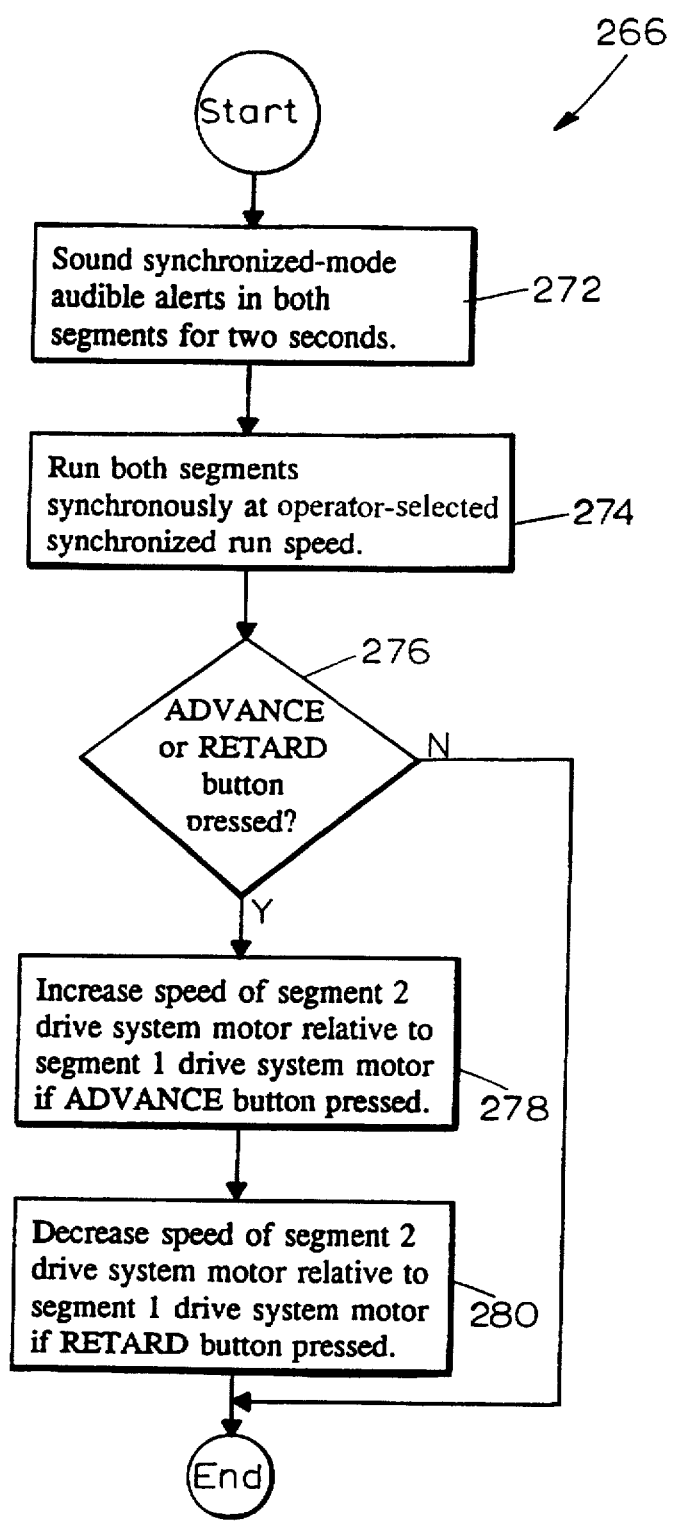
FIG. 11 is a flowchart illustrating programming executed by a block of FIG. 10B in order to RUN a binding line in the synchronized mode of FIG. 7.

The synchronized-mode operation programming of the block 214 (FIG. 8) is now described in detail in connection with FIGS. 10A–10B and 11.

Initially, a block 236 (FIG. 10A) turns off the independent mode indicator lamp 84 and the synchronized mode indicator lamp 86 (shown only in FIG. 5). At this point, the binding line 50 has made the transition denoted by the arrow 133 (FIG. 7) to the dormant state 134 of the synchronized mode 132. A block 238 then disables all INCH and RUN controls in both segments 52, 54 of the binding line 50. A block 240 then determines whether the synchronize initiate button 74 (FIG. 5) is depressed. If so, a block 242 compares the difference between the angular position of the motor 60 and that of the motor 58 with a predetermined angular offset (which may but need not be zero) and, if necessary, slowly advances the motor 60 of the second binding-line segment 54 until the angular position of the motor 60 differs from that of the motor 58 of the first binding-line segment 52 by the predetermined angular offset or until the synchronize initiate button 74 (FIG. 5) is released, whichever occurs first. The motor 60 then stops. This process corresponds to the transition denoted by arrow 140 from the dormant state 134 to the active state 136 of the synchronized mode 132 (FIG. 7). It should be noted that if the angular positions of the motors 58 and 60 differ by the predetermined angular offset at the outset, then the block 242 will not advance the motor 60. If, on the other hand, the difference between the angular positions of the motors 58 and 60 is not equal to the predetermined angular offset, then the block 242 will advance the motor 60 by at most 359° of the 360° machine cycle of the motor 60 of the second binding-line segment 54. Thereafter, a block 244 determines whether synchronization is complete (i.e., whether the segment 1 and segment 2 drive-system motors 58 and 60 are synchronized). If so, a block 246 turns on the "synchronized mode" indicator lamp 86 (FIG. 5), indicating that the binding line 50 is in the active state 136 of the synchronized mode 132 (FIG. 7), and control thereafter passes to a block 250 (described below in connection with FIG. 10B).

If the block 240 determines that the synchronize initiate button 74 (FIG. 5) is not depressed, or if the block 244 determines that the segment 1 and segment 2 drive-system motors 58, 60 are not synchronized (meaning that the synchronize initiate button 74 (FIG. 5) was released before synchronization was complete), then control passes to a block 248. This premature release of the synchronize initiate button 74 (FIG. 5) causes the binding line 50 to return to the dormant state 134 of the synchronized mode 132 via the transition denoted by the arrow 138 (FIG. 7). The block 248 determines whether the mode selector switch 72 (FIG. 5) was moved from the "synchronized mode" position to the "independent mode" position thereof. If it has, control returns to the block 200 (FIG. 8) (indicating the binding line 50 has returned to the independent mode 130 via the transition denoted by the arrow 137 (FIG. 7)). If the mode selector switch 72 is still in the "synchronized mode" position, then control returns to the block 238 and the binding line 50 remains in the dormant state 134 of the synchronized mode 132 (FIG. 7).

The block 250 (FIG. 10B) determines whether segments 1 and 2 of the binding line 50 are enabled. Specifically, the block 250 determines whether all STOP/START controls in each segment of the binding line 50 are in the START position and also whether no fault condition exists in either segment. If each of these conditions is satisfied, control returns to the block 200 (FIG. 8). If either of the conditions is not satisfied, a block 252 sets all flicker lights of the binding line 50 to flash for two minutes or until any INCH or RUN control in either segment 52, 54 of the binding line 50 is pressed, whichever is shorter. Thereafter, a block 254 determines whether any INCH or RUN control in either segment 52, 54 of the binding line 50 was pressed during the two-minute period of the block 252. If no INCH or RUN control was pressed, a block 256 generates a "safe" fault condition for the entire binding line 50 and sets all flicker lights of the binding line 50 to remain on continuously. A block 258 then determines whether the operator has reset the "safe" fault by pushing in and then pulling out one of the STOP/START controls of the binding line 50. If the block 258 determines that the operator has reset the "safe" fault, then control returns to the block 250. If the block 258 determines that the operator has not reset the "safe" fault, then a block 260 determines whether the mode selector switch 72 (FIG. 5) has been moved from the "synchronized mode" position to the "independent mode" position thereof. If so, control returns to the block 200 (FIG. 8). If not, control returns to the block 258, and the "safe" fault condition of the binding line 50 continues.

If the block 254 determines that an INCH or RUN control in either segment of the binding line 50 was pressed during the two-minute period of the block 252, then a block 262 sounds the synchronized-mode audible alerts in both segments 52, 54 of the binding line 50 for two seconds if either of two conditions is satisfied. First, the audible alerts are sounded if an INCH control in either segment 52 or 54 of the binding line 50 was pressed but had not previously been pressed during the two-minute period of the block 252. Second, the alerts are also sounded if an INCH control in either segment of the binding line 50 was pressed but was not pressed within eight seconds of the previous time when an INCH control of the binding line 50 was pressed.

Thereafter, and following any two-second audible alert sounded by the block 262, a block 264 determines whether any RUN control of the binding line 50 is depressed. If so, a block 266 executes synchronized-mode RUN programming (described in detail below in connection with FIG. 11). Execution of the synchronized-mode operation programming thereafter ends, and control returns to the block 216 (FIG. 8).

If the block 264 determines that no RUN control of the binding line 50 was pressed, then a block 268 determines whether any INCH control of the binding line 50 was pressed. If not, execution of the synchronized-mode operation programming ends, and control returns to the block 216 (FIG. 8). If an INCH control of the binding line 50 was pressed, then a block 270 INCHes both segments 52, 54 of the binding line 50 synchronously at the synchronized INCH speed thereof. Execution of the synchronized-mode operation programming then ends, and control returns to the block 216 (FIG. 8).

The synchronized-mode RUN programming of the block 266 (FIG. 10B) is now described in detail in connection with FIG. 11. First, a block 272 sounds synchronized-mode audible alerts in both segments 52, 54 of the binding line 50 for two seconds. Thereafter, a block 274 runs both binding-line segments 52, 54 synchronously at the operator-selected synchronized RUN speed of the binding line 50. While the binding line 50 is running, a block 276 determines whether the advance button 76 (FIG. 5) or the retard button 78 (FIG. 5) is pressed. If neither of these buttons is pressed, control returns to the block 216 (FIG. 8). If one of the advance and retard buttons 76, 78 is pressed, as determined by the block 276, then a block 278 increases the speed of the segment 2 drive-system motor 60 relative to the segment 1 drive-system motor 58 while the advance button 76 (FIG. 5) is pressed, and a block 280 decreases the speed of the segment 2 drive-system motor 60 relative to the segment 1 drive-system motor 58 while the retard button 78 (FIG. 5) is pressed. Thereafter, control return to the block 216 (FIG. 8) as the execution of the synchronized-mode operation programming of the block 214 (FIG. 8) is now over.

The foregoing description is for the purpose of teaching those skilled in the art the best mode of carrying out the invention and is to be construed as illustrative only. Numerous modifications and alternative embodiments of the invention will be apparent to those skilled in the art in view of this description. The details of the disclosed structure may be varied substantially without departing from the spirit of the invention, and the exclusive use of all modifications within the scope of the appended claims is reserved.

What is claimed is:

1. A drive control system for a binding line having a stitcher section and a trimmer section, the drive control system comprising:

a first motor coupled to the stitcher section;

a first motor drive coupled to the first motor;

a second motor independent of the first motor and coupled to the trimmer section;

a second motor drive coupled to the second motor;

a motion controller coupled to the first and second motor drives and operable in a first mode wherein the first and second motor drives control the first and second motors, respectively, so that the stitcher and trimmer sections operate independently of one another, and further operable in a second mode wherein the first and second motor drives control the first and second motors, respectively, so that the stitcher and trimmer sections operate in synchronism with one another; and mode-selecting means coupled to the motion controller for selecting between the synchronous and asynchronous modes for the motion controller.

2. The drive control system of claim 1, wherein the motion controller is programmable and includes advancing means for advancing the second motor relative to the first motor.

3. The drive control system of claim 1, wherein the motion controller includes retarding means for retarding the second motor relative to the first motor.

4. The drive control system of claim 1, wherein the motion controller comprises a programmable motion controller.

5. The drive control system of claim 1, wherein the motion controller is programmable and includes mode-indicating means operable at any particular time for indicating the mode of the motion controller at the particular time.

6. The drive control system of claim 5, wherein the mode-indicating means includes means for providing audibly distinguishable signals for the first and second binding-line segments corresponding to at least one of the modes of the motion controller.

7. The drive control system of claim 5, wherein the mode-indicating means includes means for providing audibly distinguishable signals for the first and second binding-line segments corresponding to each mode of the motion controller.

8. The drive control system of claim 5, wherein the mode-indicating means includes means for providing visually distinguishable signals for the first and second binding-line segments corresponding to at least one of the modes of the motion controller.

9. The drive control system of claim 5, wherein the mode-indicating means includes means for providing visually distinguishable signals for the first and second binding-line segments corresponding to each mode of the motion controller.

10. The drive control system of claim 1, wherein the mode-selecting means includes a selector operable between at least a first state wherein the asynchronous mode is selected for the motion controller and a second state wherein the synchronous mode is selected for the motion controller.

11. The drive control system of claim 10, wherein the synchronous mode of the motion controller comprises an active synchronous mode and an inactive synchronous mode, and wherein the drive control system further includes an activator, operable when the selector is in the second state thereof and the motion controller is in the inactive synchronous mode, for placing the motion controller in the active synchronous mode.

12. The drive control system of claim 11, wherein the activator is operable to place the motion controller in the active synchronous mode only when the selector is in the second state thereof.

13. The drive control system of claim 12, wherein the motion controller includes preventing means for preventing either of the first and second binding-line segments from being turned on when the motion controller is in the inactive synchronous mode.

14. The drive control system of claim 13, wherein the preventing means prevents the first and second binding-line segments from being turned on from a first time when the motion controller is in the inactive synchronous mode until a second time when the motion controller is in the active synchronous mode.

15. The drive control system of claim 14, wherein the motion controller includes mode-indicating means operable at any particular time for indicating the mode of the motion controller at the particular time.

16. The drive control system of claim 15, wherein the mode-indicating means indicates when the motion controller is in one of the active synchronous, inactive synchronous, and asynchronous modes.

17. The drive control system of claim 16, wherein the mode-indicating means further indicates the occurrence of a transition period extending from a first time when the motion controller is in the inactive synchronous mode until a second time when the motion controller is in the active synchronous mode.

* * * * *